（12）United States Patent
Kristensen et al.

(10) Patent No.: US 11,176,385 B2
(45) Date of Patent: Nov. 16, 2021

(54) METHOD AND SYSTEM FOR GENERATING MAP INFORMATION FOR EMERGENCY SURFACES

(71) Applicant: Continental Automotive GmbH, Hannover (DE)

(72) Inventors: Steen Kristensen, Lindenberg im Allgäu (DE); Henning Hamer, Munich (DE); Ralph Grewe, Frankfurt am Main (DE)

(73) Assignee: Continental Automotive GmbH, Hannover (DE)

( * ) Notice: Subject to any disclaimer, the term of this patent is extended or adjusted under 35 U.S.C. 154(b) by 104 days.

(21) Appl. No.: 16/316,956

(22) PCT Filed: Jun. 2, 2017

(86) PCT No.: PCT/EP2017/063416
§ 371 (c)(1),
(2) Date: Jan. 10, 2019

(87) PCT Pub. No.: WO2018/010891
PCT Pub. Date: Jan. 18, 2018

(65) Prior Publication Data
US 2019/0318173 A1 Oct. 17, 2019

(30) Foreign Application Priority Data
Jul. 11, 2016 (DE) .................... 10 2016 212 587.7

(51) Int. Cl.
*G06K 9/00* (2006.01)
*B60W 30/09* (2012.01)
(Continued)

(52) U.S. Cl.
CPC ......... *G06K 9/00798* (2013.01); *B60W 30/09* (2013.01); *B60W 30/18009* (2013.01);
(Continued)

(58) Field of Classification Search
CPC ......... B60W 2552/00; B60W 2556/50; B60W 30/09; B60W 30/18009; G01C 21/32; G06K 9/00798
See application file for complete search history.

(56) References Cited

U.S. PATENT DOCUMENTS 8,751,154 B2 * 6/2014 Zhang ................ G06K 9/00818
701/411
9,989,967 B2 * 6/2018 Jacobus ................ G01S 7/4808
(Continued)

FOREIGN PATENT DOCUMENTS

DE  102009039086 A1  3/2011
DE  102013015349 A1  4/2014
(Continued)

OTHER PUBLICATIONS

Office Action dated Apr. 20, 2017 from corresponding German Patent Application No. 10 2016 212 587.7.
(Continued)

Primary Examiner — Tyler J Lee

(57) ABSTRACT

A system for generating map information for one or more road sections of a digital road map comprises an interface for receiving data records for the one or more road sections. The data records describe properties of surfaces outside the immediate road area. The system further comprises a first module for evaluating the received data records in order to identify first surfaces outside the immediate road area that are able to be driven on by a vehicle after leaving the road and on which the vehicle can be brought to a standstill after leaving the road, a second module for generating a description of the first surfaces in a format suitable for digital road maps, and a third module for retrievably providing the description of the first surfaces in one or more formats suitable for digital road maps.

14 Claims, 3 Drawing Sheets

(51) Int. Cl.
*B60W 30/18* (2012.01)
*G01C 21/32* (2006.01)
(52) U.S. Cl.
CPC ......... *G01C 21/32* (2013.01); *B60W 2552/00* (2020.02); *B60W 2556/50* (2020.02)

(56) References Cited

U.S. PATENT DOCUMENTS

| | | | |
|---|---|---|---|
| 10,474,164 B2* | 11/2019 | Wheeler | G01C 21/32 |
| 2004/0113489 A1* | 6/2004 | Iwagawa | B60T 8/17616 |
| | | | 303/155 |
| 2007/0085417 A1* | 4/2007 | Kamikado | B60T 7/122 |
| | | | 303/192 |
| 2009/0192686 A1* | 7/2009 | Niehsen | G06K 9/3241 |
| | | | 701/70 |
| 2010/0253540 A1* | 10/2010 | Seder | G01S 13/867 |
| | | | 340/905 |
| 2012/0226392 A1* | 9/2012 | Kataoka | G08G 1/167 |
| | | | 701/1 |
| 2012/0303215 A1* | 11/2012 | Kim | G01D 9/005 |
| | | | 701/36 |
| 2015/0353080 A1 | 12/2015 | Mukaiyama | |
| 2016/0009265 A1* | 1/2016 | Kinoshita | B60T 8/4081 |
| | | | 303/157 |
| 2017/0057510 A1* | 3/2017 | Herbach | B62D 15/0265 |

FOREIGN PATENT DOCUMENTS

| | | |
|---|---|---|
| EP | 1150100 A2 | 10/2001 |
| EP | 2960887 A2 | 12/2015 |
| JP | H05196677 A | 8/1993 |
| JP | 2002287617 A | 10/2002 |
| JP | 2009169527 A | 7/2009 |
| JP | 2010-96890 A | 4/2010 |
| JP | 2015-230641 A | 12/2015 |
| WO | 2006/126425 A1 | 11/2006 |
| WO | 2012/019628 A1 | 2/2012 |
| WO | 2015/200086 A1 | 12/2015 |

OTHER PUBLICATIONS

International Search Report and Written Opinion dated Aug. 23, 2017 from corresponding International Patent Application No. PCT/EP2017/063416.

* cited by examiner

METHOD AND SYSTEM FOR GENERATING MAP INFORMATION FOR EMERGENCY SURFACES

BACKGROUND

Technical Field

The present method and system relate to the generation of map information, for example for use in navigation systems, eHorizon systems, driver assistance systems, or generally as a basis for autonomous or highly automated driving.

eHorizon systems integrate digital topographic map data with sensor data, for example from a GPS receiver, for predictively controlling vehicle systems. Future events, e.g. the gradient after the next curve, are used in advance for adapting control of the vehicle. eHorizon systems in this instance interpret map and sensor data and adapt motor and transmission management, for example, automatically.

Prior Art

Some systems today for highly automated or autonomous driving use digital road maps or 3D-CAD models of roads, that is to say digital representations of roads containing not only the road profile projected into a surface but also height information and possibly information pertaining to objects above the road surface, that contain information about very many features of a road or of a carriageway or lane of a road and provide a very high resolution of detail. The road maps or 3D-CAD models can be available as traverses between nodes, but also in other formats. Details comprise, besides a general geo-position, a width, a lane geometry and a number of lanes for each direction at each location on the road, particular further features of the road that vary only slowly, or do not vary, over time. These features comprise carriageway markings, objects to the side of the road, e.g. boundary posts, road signs or lamp posts, but also junctions of roads or entrances, and the like, for example. The details of the road or of the carriageway or lane, or respective reference points thereon, are linked to exact geo-positions on the map and are continually registered during highly automated or autonomous driving and used for tracking and/or position determination during the journey.

BRIEF SUMMARY

Vehicles with highly automated or autonomous driving need to be able, like a human driver, to bring the vehicle to a safe position, that is to say to bring it to a standstill at a safe location, for example, in the event of unforeseen events and/or malfunctions. This function is also referred to as a minimal risk maneuver, or MRM. A human driver must, when required, register all suitable locations, select one of them and steer the vehicle such that the location can be reached safely, within the shortest time.

When driving on a multilane freeway, a safe location of this kind is e.g. the hard shoulder or a rest area. These safe locations are also recorded on many standard digital road maps. On route sections without a hard shoulder, for example in roadworks, an emergency stopping bay can be considered a safe location. These are normally not recorded on the standard digital road maps, in particular in roadworks set up only temporarily. Along other roads, suitable safe locations are often outside the actual road, when in regions that are ignored or not registered in the first place when producing the digital road map. By way of example, median strips, meadows or arable land beside the road, entrances to private properties or else parking space areas running along the road can be suitable as a safe location, depending on the situation. The currently available digital maps do not map such locations with sufficient accuracy and up-to-dateness that they can be used for the matter of highly automated or autonomous driving. Currently available sensor systems cannot register these locations with sufficient accuracy in real time and take them as a basis for a driving maneuver.

The invention relates to a system for generating map information. The system can comprise a computer program that performs a corresponding method for generating map information and that can be stored on a data storage medium. The invention additionally relates to a vehicle having such a system.

The system comprises means for receiving data records relating to one or more road sections of a digital road map, wherein the data records describe properties of surfaces outside the immediate road area. The means can comprise one or more digital data interfaces having transmitters and/or receivers that are in a form compatible with one or more telecommunication standards and are communicatively connected to other components of the system. The system additionally comprises a first data processing unit that is communicatively connected to the digital interface(s), analyses the received data records and generates map information therefrom for digital road maps representing the surfaces outside the immediate road area. The data processing unit can comprise one or more computers performing a corresponding computer program that implements the method for generating map information.

The system can also be regarded as being formed from one or more function blocks as in a functional module architecture. In this instance, respective function blocks represent means for performing applicable functions. The means can also be implemented by one or more computers or data processing units configured by a computer program for performing applicable functions. The one or more computers or processing units can comprise one or more microprocessors communicatively connected to main memory and/or nonvolatile storage means and other system components via one or more data buses that receive and/or send data before and/or during the execution of computer program instructions, as a result of which the computers or processing units perform at least parts of the method. The nonvolatile storage means comprise different storage media, e.g. optical or magnetic memories, phase change or flash memories. Multiple modules or function blocks can be implemented in a computer or a data processing unit.

At least parts of the system can be arranged in a controller of a motor vehicle. The controller can contain a microprocessor communicatively connected to storage means via one or more data buses. The microprocessor is configured to execute computer program instructions stored in the storage means and to send and/or receive data via the one or more data buses. The storage means can comprise main memory and nonvolatile memory. Nonvolatile memory comprises e.g. optical, magnetic, phase change or flash memories. The one or more data buses can be configured to transfer control commands and/or data of different controllers, sensors and/or actuators unidirectionally or bidirectionally. Methods required for this purpose can be implemented by the microprocessor during execution of the computer program instructions.

The computer program instructions can be transferred to the storage means by using interfaces connected wirelessly or by means of cables or lines. The computer program instructions are available outside the system as a computer program product that is permanently stored on a computer-readable medium or machine-readable medium and that can be regarded as a computer program stored on a carrier medium.

The computer program product can also be available in a non-permanent, temporary form, e.g. as an electromagnetic or optical signal temporarily representing the computer program instructions by means of its modulation. The modulation therefore imparts the computer program instructions to the signal in temporarily readable form, for example during transfer of the computer program instructions from a data carrier to the system. In this case, the signal, e.g. represented by a modulated carrier, is a specific embodiment of the computer program product from which it can be taken or tapped off.

A method, performed in the system and possibly implemented by a corresponding computer program, for generating map information for one or more road sections of a digital road map involves the first data processing unit being supplied with one or more previously received data records for one or more road sections, wherein the data records describe properties of surfaces outside the immediate road area of the respective road sections.

Within the context of this description, immediate road area refers to the surfaces of a road or traffic route, that is to say in particular lanes of a road, junction areas and the like, that are able to be driven on by vehicles under respectively current traffic rules in nonstationary traffic. Data describing the immediate road area can also contain information going beyond the surface of the road area, that is to say information about a height limit, or a height of objects that are in the road area. The same applies to data describing surfaces outside the immediate road area.

The data records can comprise images of the road area and in particular of the surfaces outside the immediate road area that are recorded by means of a camera or another suitable apparatus of a vehicle driving on a road. Other suitable apparatuses comprise, by way of example, radar, lidar or ultrasonic systems from whose signals images are compiled by means of applicable software running on a computer system. The term images is used in this context not exclusively in the concrete sense but includes other suitable representations of surroundings scanned by respective apparatuses, for example disparity maps, lidar or radar peak lists, or else images that are already partially edited or analysed. A partially edited or analysed image is an image to which vector information corresponding to edges of objects or of road markings has been added, for example. Depending on the level of editing or analysis, the underlying image can then be compressed more heavily or concurrently transferred at a lower resolution, for example. If further analysis is already effected in the vehicle, it can suffice to transmit an abstract representation of a surface to the first data processing unit, for example a traverse representing a surface, or an appropriate grid pattern. The level of editing in the vehicle can in this instance depend on the extent to which the images are evaluated directly in the vehicle, for example for purposes of autonomous or highly automated driving.

The data records are generated by a multiplicity of vehicles while they are driving on applicable road sections. The data records can in this instance also comprise information about an area above the surfaces outside the immediate road area, in particular about a clear headroom. Additionally, if at least partial analysis is already effected in the vehicle, the data records can contain information that can be used to categorize the surfaces.

A categorization can be effected on the basis of a suitability of the surface for vehicles of different types to drive on, for example. Types of vehicles comprise automobiles, trucks, what are known as sports utility vehicles (SUVs), for example. Characterization can be effected on the basis of a ground clearance, a vehicle height, a vehicle width or length, a turning circle radius, a vehicle weight, a number of driven and/or nondriven axles, a presence of a trailer, etc. The suitability can be dependent on the condition of the surface, for example. As such, a tarred, smooth surface has a high probability of being able to be driven on by many vehicle types, whereas a surface covered with loose gravel or sand has a higher probability of having a low load-bearing capability and may thus be less suitable for heavy vehicles. Other surfaces, such as e.g. grass or particular types of road, can also have a weather-dependent suitability. As such, e.g. a grass surface is more slippery and possibly softer in rain than in dry weather. The evenness of the surface can also be used for the categorization. A very uneven surface may still be able to be driven on by vehicles having a larger ground clearance, whereas it can no longer be driven on by vehicles having a smaller ground clearance. A categorization can also be effected on the basis of a type of load. As such, it may not be advisable for vehicles having a water-endangering load to leave the carriageway to reach a safe location in a water reserve, whereas vehicles with a different load or without a load are not restricted at this place. These and similar categorizations can be effected by means of recognition of applicable road signs installed in proximity to the surfaces, for example.

The categorization can be used to allow a vehicle needing to perform a minimal risk maneuver to select the surface most suitable in a present situation from among a multiplicity of available surfaces of different suitability or categorization. As such, paved surfaces can be prioritized ahead of unpaved surfaces, but there can also be grading within unpaved surfaces, e.g. gravel ahead of sand, sand ahead of grass. On the other hand, depending on the dangerousness of a situation, a nearer grass surface can be preferred over an asphalt surface further away.

The received data records are evaluated in the first data processing unit in order to identify surfaces outside the immediate road area that are able to be driven on by a vehicle after leaving a road, for example in order to bring the vehicle to a standstill there. In this instance, the information contained in the data records that is suitable for a categorization can be taken into consideration for individual surfaces as appropriate. A categorization can also first be effected by the evaluation in the first data processing unit, however, e.g. by means of image analysis methods and comparison of image content representing the surface with reference patterns or reference textures characteristic of particular surfaces. Images recorded by means of stereo cameras, radar or lidar can be used to ascertain a height profile progression or a ripple in the surface. Mono cameras can likewise be used if there is a shift in the recording location between successive images, with at least some image regions overlapping. Surfaces registered by means of lidar or radar sensors can be rated as suitable despite the presence of vegetation with grasses or other soft plants. As a result of the evaluation, information about geographical locations of the surfaces, their size, their surface condition and the like is available that can be added to digital road maps in a suitable format. The information is provided retrievably in one or more formats suitable for digital road maps, navigation systems, ADAS systems and/or eHorizon systems. To simplify matters, this description uses the term digital road map to represent the different formats of the different systems. Retrievable provision in this case comprises not only transfer in reaction to an applicable enquiry from a system that uses the data (pull transfer) but also transfer of the information that is triggered by the first data processing unit without a preceding specific enquiry (push data transfer).

In principle, it is possible to perform the detection of potential emergency surfaces entirely in a vehicle or exclusively in the first data processing unit. A combination of the two is likewise possible. In this instance, the vehicle or the first data processing unit can use methods that are based on a sequence of temporally successive individual measurements or individual registrations by the same vehicle. The evaluation in the first data processing unit can furthermore also take into consideration temporally coincident or separate measurements or registrations by a multiplicity of different vehicles.

Depending on a respective format suitable for a digital road map, surfaces outside the immediate road area can be represented in a similar manner to lanes. Alternatively, it is possible to represent the surfaces by means of an enclosing curve, for example as a traverse, as a spline or as a raster grid.

According to one aspect of the method, ranges of speeds and/or trajectories for which or in compliance with which it is possible to drive on the surface are ascertained for respective surfaces. Corresponding information is added to the digital road map or the eHorizon data. This aspect can influence a selection of a suitable surface for a vehicle, for example if a maximum speed for driving on a nearest surface can no longer safely be reached from the present speed and geo-position by means of a braking maneuver, or a trajectory range for driving on the surface requires a curve radius that the vehicle cannot comply with. In such a case, a surface further away could be selected, if need be even with a top that is less suitable for the vehicle type than that of the nearest, unselected surface.

According to one aspect of the method, a multiplicity of data records are received for each road section, wherein the data records have been generated at different times. Each data record comprises applicable information, for example day of the week, time of day, date. This information can be used to determine a probability of a surface outside the immediate road area being available for a minimal risk maneuver at a given time.

This aspect allows an availability of a parking area running parallel beside a carriageway of a road to be assessed at a particular time, for example. An evaluation of a multiplicity of data records relating to a road section over a longer period for different times of day or days of the week can reveal that a parking strip is usually not free at particular times of day on particular days of the week, for example, whereas it is not or only seldom occupied at other times of day or on other days, e.g. on holidays. In this instance, date details can be linked to holidays or times of day can be linked to opening times of shops or authorities situated on this road section by querying applicable databases.

However, this aspect also allows a surface outside the immediate road area to be categorized as suitable when this cannot be effected reliably by means of a single registration. By way of example, thick vegetation on a surface with longer grasses or cereal can lead to a surface being rated as unsuitable. However, recurring registration over an entire year allows the same surface to be registered again at a time at which there is no or only low vegetation, e.g. owing to mowing that has since taken place, and the actual top of the surface is detectable for a categorization. Seasonally dependent vegetation that does not prevent the surface from being driven on in an emergency can therefore be taken into consideration for the categorization. Naturally, this can also be taken into consideration for the prioritization if multiple surfaces outside the immediate road area are selectable for an imminent minimal risk maneuver. As such, by way of example, it is possible to avoid damage to surfaces used agriculturally if another suitable surface nearby can be reached and is equally well suited. The more data records collected for different seasons for a surface outside the immediate road area, if need be even over several years, the better a suitability of the surface at a particular time can be ascertained.

The information about surfaces outside the immediate road area that is available in formats suitable for digital road maps is transmitted from the first data processing unit to autonomous or highly automated driving vehicles. This transmission can be effected via mobile radio networks, WLAN networks, car-to-car or car-to-infrastructure networks or the like.

According to one aspect of the method performed by the system, surfaces identified in the first data processing unit are verified manually, for example by inspecting the location, or by means of comparison with aerial or satellite photographs, before they can be transmitted to autonomously or highly automated driving vehicles.

An autonomously or highly automated driving vehicle receives information regarding one or more first surfaces within a radius of a geo-position at a present time, either in response to an enquiry to the system or in the course of a push update triggered by the system. A navigation device arranged in the vehicle, an eHorizon or another suitable driver assistance system can analyse the now available information about surfaces outside the immediate road area for an imminent minimal risk maneuver. A specific selection of a surface can additionally be dependent on further factors that are registered by sensors arranged locally on or in the vehicle or that are extracted from digital road map information or eHorizon information. As such, by way of example, it is possible to take into consideration typical or maximum permissible speeds on a road section, a present visibility, a present traffic density in the direction of travel and/or of the oncoming traffic and the like, and accordingly to decide to stop on the road. Stopping on the road is frequently not a problem e.g. in urban surroundings and easier than on a freeway, and can fundamentally be preferred, if only to be able to continue the journey without any problem.

BRIEF DESCRIPTION OF THE DRAWINGS

Aspects of the invention will be described below with reference to the drawing. In the drawing.

DETAILED DESCRIPTION

Description of the Exemplary Embodiments

Figure 1:
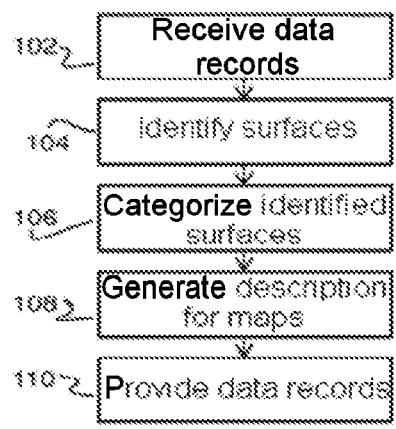
FIG. 1 shows an exemplary simplified flowchart for an aspect of the method performed by the system.

In the figures of the drawing, identical or similar elements are denoted by the same reference signs.

FIG. 1 shows an exemplary simplified flowchart for an aspect of the method performed by the system. The flowchart can in this instance also be regarded as a depiction of functional modules, each module performing applicable parts of the method. In step or module 102, data records are received that comprise information pertaining to properties of surfaces outside the immediate road area. In step or module 104, the information is subjected to an analysis in order to identify surfaces that can be driven on after leaving a road. In step or module 106, a categorization of the identified surfaces is effected, e.g. on the basis of a suitability for particular vehicle types. In step or module 108, a description in one or more formats suitable for digital road maps is generated for the identified and possibly categorized surfaces, said description being provided retrievably in step or module 110.

Figure 2:
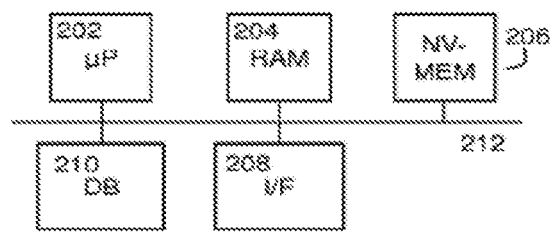
FIG. 2 shows a first exemplary block diagram of a system suitable for performing at least parts of the method.

FIG. 2 shows a first exemplary block diagram of a system suitable for performing at least parts of the method. Microprocessor 202, RAM 204, nonvolatile memory 206, interface 208 and database 210 are communicatively connected to one another via one or more bus systems 212. The nonvolatile memory 206 contains computer program instructions that, when executed by the microprocessor 202 in conjunction with the main memory 204 and possibly with access to further system components, perform at least parts of one or more aspects of the method according to the invention.

Figure 3:
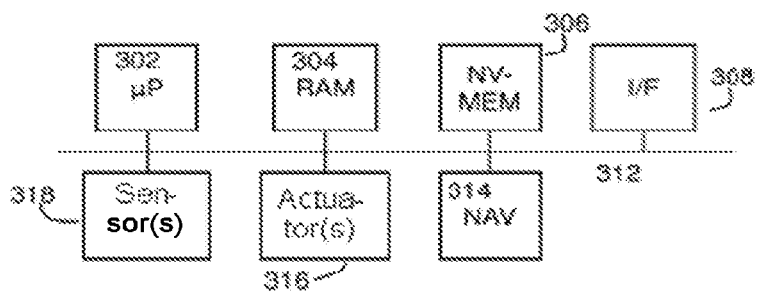
FIG. 3 shows a second exemplary block diagram of a system suitable for performing at least parts of the method.

FIG. 3 shows a second exemplary block diagram of a system suitable for performing at least parts of the method. The system depicted by way of example can be arranged in a vehicle and can be equipped with sensors for registering surfaces outside the immediate road area, wherein at least part of the analysis performed by the overall system is performed by data processing units arranged in the vehicle. The system depicted by way of example can also provide functions needed for autonomous or highly automated driving, e.g. actuation of actuators. To this end, the system depicted in FIG. 2 comprises a microprocessor 302 communicatively connected to RAM 304 and nonvolatile memory 306 via one or more bus systems 312. Additionally, interface 308, sensors 318 and actuators 316 are communicatively connected to other components of the system via the one or more bus systems 312. A navigation system 314 can be provided for determining the geo-position of the vehicle and can likewise be communicatively connected to other components of the system via the one or more bus systems 312. The nonvolatile memory 306 contains computer program instructions that, when executed by the microprocessor 302 in conjunction with the main memory 304 and possibly with access to further system components, perform at least parts of one or more aspects of the method according to the invention.

Figure 4:
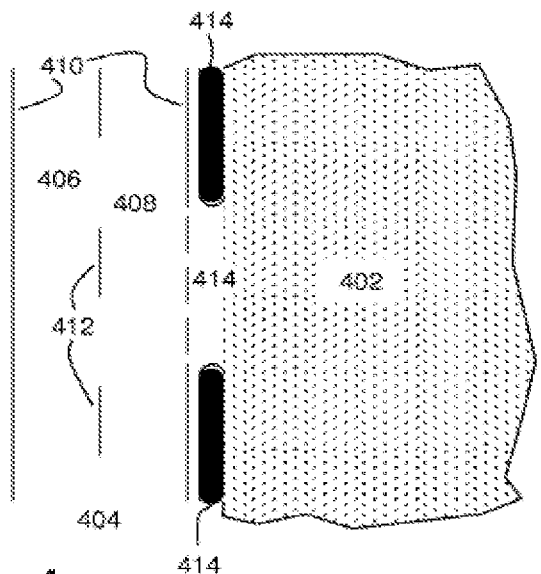
FIG. 4 shows a first schematic depiction of a surface suitable for MRM.

FIG. 4 shows a first schematic depiction of a surface 402 suitable for MRM. The surface 402 is outside the immediate road area of a road 404 that has two carriageways 406 and 408. The road additionally has lateral boundary lines 410 and a broken central line 412. The surface 402 beside the road 404 is separated from the road 404 by a trench 414 that vehicles cannot drive through, e.g. owing to its width, depth or the profile progression. The trench 414 is bridged in a region 416. Such a bridge is known for surfaces used agriculturally that have provision for access from the road, for example. The surface 402 has been registered by one or more vehicles and, after analysis in a system according to the invention, rated as suitable for MRM. Registration has also resulted in the start and end of the region 414 bridging the trench being registered. This registration was effected e.g. by means of appropriate detection of the lateral boundary line 410 broken in the region 414 or by means of analysis of an image content mapping this region. The geo-position of the surface 402 and of the start and end of the bridge are accordingly contained in data for a digital road map and, as a result, known for an imminent MRM in advance.

Figure 5:
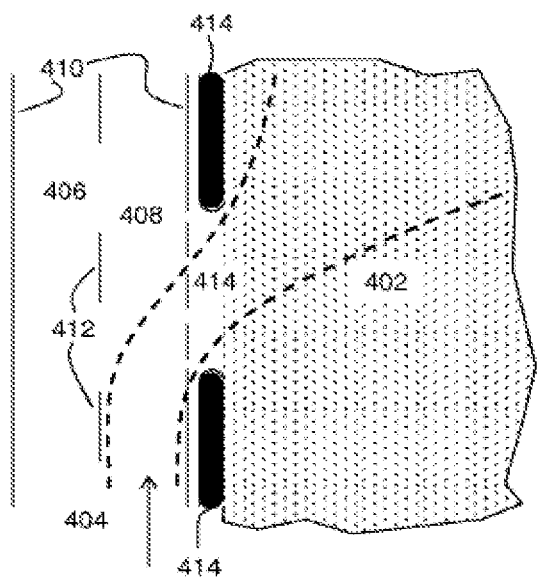
FIG. 5 shows a second schematic depiction of the surface suitable for MRM from FIG. 4 with a driving range limited for a given situation.

FIG. 5 shows a second schematic depiction of the surface suitable for MRM from FIG. 4 with a driving range limited for a given situation. The depiction is consistent with that of FIG. 4. Additionally, it should be assumed that a vehicle, not shown in the figure, is driving on the road at a particular speed coming from the bottom in the direction of the arrow. The dashed lines 502 and 504 represent a driving corridor, appropriate to the vehicle type and the present speed of the vehicle, that the vehicle would be able to use without danger in the event of an MRM becoming necessary.

Figure 6:
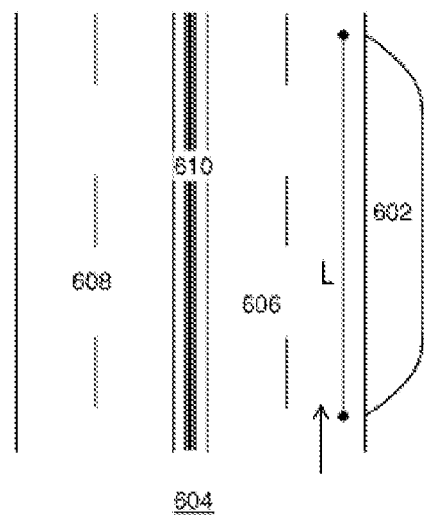
FIG. 6 shows a third schematic depiction of a surface suitable for MRM.

FIG. 6 shows a third schematic depiction of a surface 602 suitable for MRM. The surface 602 is an emergency stopping bay situated on a road 604 having two carriageways 606, 608 that are physically separated and each have two lanes. Owing to the physical separation 610, an evasive maneuver by a vehicle (not shown) travelling in the direction of the arrow cannot be effected in the region of the opposite carriageway, which would be possible without danger in situations in which there is no oncoming traffic. The geo-position of the emergency stopping bay 602, in particular the start and the length L, are accordingly contained in data for a digital road map and, as a result, known for an imminent MRM in advance. If the road 604 only temporarily has no shoulder, for example because roadworks mean that the four lanes have been put together over a narrower area using the shoulder, the present system allows prompt registration and categorization of the surface 602 suitable for an MRM, and an appropriate update to the information for digital road maps.

Figure 7:
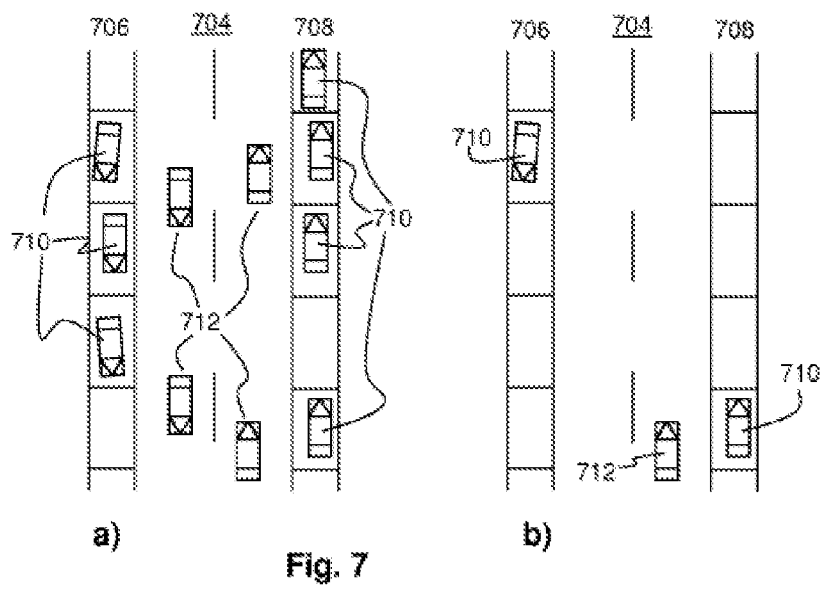
FIG. 7*a* shows a fourth schematic depiction of a surface intermittently suitable for MRM at a first time.
FIG. 7b shows a schematic depiction of the surface intermittently suitable for MRM from FIG. 7a at a second time.

FIG. 7 shows a fourth schematic depiction of a surface intermittently suitable for MRM at a first time. The figure shows a two-lane road 704 having a respective carriageway for each direction. Beside each carriageway there is arranged a respective parking strip 706, 708 with a series of parking spaces, which in FIG. 7a are largely occupied by parked vehicles 710. Also, there is heavy automobile traffic, indicated by the vehicles 712 on the road 704. The situation shown in FIG. 7a could arise in a city at usual opening times for shops or authorities, for example the parking spaces becoming free and being reoccupied within a short time. Thus, no surfaces valid over a longer period are explicitly determinable for MRM. FIG. 7b shows the same road 704 at another time, for example at a weekend or on a holiday, at which none of the shops or no authorities are open. Only a few parking spaces are occupied by parked vehicles 710, and there is also no heavy traffic, indicated by the single vehicle 712. The occupancy of the parking spaces has a high probability of not changing within shorter periods, which means that the coherently free parking spaces on the parking strips 706, 708 can be rated as having a corresponding probability of being suitable for an MRM. Corresponding probability values for a given time of day and a given day of the week or holiday can be contained in the information for digital road maps or updated promptly, which means that, by way of example, an autonomously driving vehicle approaching the road section shown in the figure has information available in advance about a nearby surface that is possibly suitable for an MRM.

The system and method described above allow a vehicle equipped with an eHorizon system or an autonomously or highly automated driving vehicle to be provided with current information about suitable surfaces for minimal risk maneuvers. In this instance, the data records on which the information is based are repeatedly re-registered by a multiplicity of vehicles, so that the availability is repeatedly verified afresh and new suitable surfaces are added and surfaces that are no longer available are removed. As such, at any time during the journey, the maximum distance to be covered before the vehicle can be brought to a standstill at a safe location in the event of a minimal risk maneuver is known. If the distance is too great, control of the vehicle can be returned to a driver, who can then make a decision according to the situation. As a result of the geo-positions of suitable emergency surfaces already being known in advance, a suitable escape surface can be safely determined or selected even in the event of failure of one or more sensors providing the information needed for ascertaining suitable escape surfaces in real time.

The invention claimed is:

1. A system for generating and using map information for one or more road sections of a digital road map, comprising:
   an interface for receiving data sets for the one or more road sections, wherein the data sets describe properties of areas outside the immediate road space,
   a first module for evaluating the received data sets in order to identify first areas outside the immediate road space that are able to be driven on by a vehicle after leaving the road and on which the vehicle can be brought to a standstill after leaving the road,
   a second module for generating a description of the first areas in a format suitable for digital road maps,
   a third module to provide on demand the description of the first areas in one or more formats suitable for digital road maps,
   wherein the system is adapted to receive a plurality of data sets for each road section, said plurality of data sets having been acquired or generated at different times, each data set comprising information of the time of the respective acquisition or generation, characterized in that the system is adapted to indicate, by using the information of the time, for the first areas, a probability with which they are available for a minimal risk maneuver at a given time and to infer a suitability for a minimal risk maneuver from different properties of the first areas at different times during a year, and wherein the vehicle uses the inferred suitability, in real time, while travelling on the road, to perform a minimal risk maneuver to bring the vehicle to a standstill at a safe location, wherein the vehicle is at least one of an autonomous vehicle and a highly automated vehicle.

2. The system as claimed in claim 1, additionally comprising a fourth module for categorizing the first surfaces into different categories, wherein the categorization is effected on the basis of one or more of the criteria contained in the following list: a suitability of the first surface for different vehicle types, a condition of the top of the first surface, weather conditions for which the condition of the surface is valid, a probability and/or costs of damage to the surface that arises while the surface is being driven on.

3. The system as claimed in claim 1, wherein the second module additionally complements the description of the first surfaces with information representing ranges of speeds and/or trajectories for which and/or in compliance with which it is possible to drive on the surface.

4. The system as claimed in claim 1, wherein performing the minimal risk maneuver to bring the vehicle to a standstill at a safe location further comprises actuating at least one actuator of the vehicle.

5. A method for generating and using map information for one or more road sections of a digital road map, comprising:
   receiving data records for the one or more road sections, wherein the data records describe properties of areas outside the immediate road space,
   evaluating the received data records in order to identify first areas outside the immediate road space that are able to be driven on by a vehicle after leaving the road and on which the vehicle can be brought to a standstill after leaving the road,
   generating a description of the first areas in a format suitable for digital road maps,
   providing on demand the description of the first areas in one or more formats suitable for digital road maps,
   wherein a plurality of data sets is received for each specific road section, said plurality of data sets having been acquired or generated at different times, each data set comprising information of the time of the respective acquisition or generation, characterized in that, by using the information of the time, for the first areas, a probability is indicated with which they are available at a given time for driving with a minimal risk maneuver and a suitability for a minimal risk maneuver is concluded from different properties of the first areas at different times during one year, and wherein the vehicle uses the inferred suitability, in real time, while travelling on the road, to perform a minimal risk maneuver to bring the vehicle to a standstill at a safe location, wherein the vehicle is at least one of an autonomous vehicle and a highly automated vehicle.

6. The method as claimed in claim 5, additionally comprising:
   categorizing the first areas into sub-areas of different categories, wherein the categorization is effected on the basis of one or more of the criteria contained in the following list: a suitability of the first surface for different vehicle types, a condition of the top of the first surface, weather conditions for which the condition of the surface is valid, a probability and/or costs of damage to the surface that arises while the surface is being driven on.

7. The method as claimed in claim 5, additionally comprising:
   supplementing the description of the first areas with information representing ranges of speeds and/or trajectories for which or in compliance with which it is possible to drive on the surface.

8. The method as claimed in claim 5, additionally comprising:
   receiving an enquiry regarding an availability of one or more first surfaces within a radius of a geo-position at a present time, and
   sending information representing the availability of surfaces within the radius for a minimal risk maneuver, which information is extracted from a respective data record most recently received for the one or more first surfaces.

9. The method as claimed in claim 5, wherein performing the minimal risk maneuver to bring the vehicle to a standstill at a safe location further comprises actuating at least one actuator of the vehicle.

10. A computer program product for generating and using map information for one or more road sections of a digital road map, which is stored on a non-transitory computer-readable medium and comprises program instructions that, when executed by a computer, cause performance of operations comprising:
receiving data records for the one or more road sections, wherein the data records describe properties of areas outside the immediate road space,
evaluating the received data records in order to identify first areas outside the immediate road space that are able to be driven on by a vehicle after leaving the road and on which the vehicle can be brought to a standstill after leaving the road,
generating a description of the first areas in a format suitable for digital road maps,
providing on demand the description of the first areas in one or more formats suitable for digital road maps,
wherein a plurality of data sets is received for each specific road section, said plurality of data sets having been acquired or generated at different times, each data set comprising information of the time of the respective acquisition or generation, characterized in that, by using the information of the time, for the first areas, a probability is indicated with which they are available at a given time for driving with a minimal risk maneuver and a suitability for a minimal risk maneuver is concluded from different properties of the first areas at different times during one year, and wherein the vehicle uses the inferred suitability, in real time, while travelling on the road, to perform a minimal risk maneuver to bring the vehicle to a standstill at a safe location, wherein the vehicle is at least one of an autonomous vehicle and a highly automated vehicle.

11. The computer program product as claimed in claim 10, further comprising program instructions that, when executed by a computer, cause performance of operations comprising:
categorizing the first areas into sub-areas of different categories, wherein the categorization is effected on the basis of one or more of the criteria contained in the following list: a suitability of the first surface for different vehicle types, a condition of the top of the first surface, weather conditions for which the condition of the surface is valid, a probability and/or costs of damage to the surface that arises while the surface is being driven on.

12. The computer program product as claimed in claim 10, further comprising program instructions that, when executed by a computer, cause performance of operations comprising:
supplementing the description of the first areas with information representing ranges of speeds and/or trajectories for which or in compliance with which it is possible to drive on the surface.

13. The computer program product as claimed in claim 10, further comprising program instructions that, when executed by a computer, cause performance of operations comprising:
receiving an enquiry regarding an availability of one or more first surfaces within a radius of a geo-position at a present time, and
sending information representing the availability of surfaces within the radius for a minimal risk maneuver, which information is extracted from a respective data record most recently received for the one or more first surfaces.

14. The computer program product as claimed in claim 10, wherein performing the minimal risk maneuver to bring the vehicle to a standstill at a safe location further comprises actuating at least one actuator of the vehicle.

* * * * *